(12) United States Patent
Elkis et al.

(10) Patent No.: US 6,530,319 B1
(45) Date of Patent: Mar. 11, 2003

(54) QUICK CHANGE INK ROLL

(75) Inventors: Michael Elkis, Columbia, MD (US); Mark R. Donovan, Severn, MD (US); William F. Ward, Jr., Teton Village, WY (US)

(73) Assignee: Ward Holding Company, Inc., Wilmington, DE (US)

( * ) Notice: Subject to any disclaimer, the term of this patent is extended or adjusted under 35 U.S.C. 154(b) by 0 days.

(21) Appl. No.: 09/950,125

(22) Filed: Sep. 10, 2001

(51) Int. Cl.[7] .............................. B41F 5/00; B41F 11/02; B41F 1/46; B41F 31/00
(52) U.S. Cl. ...................... 101/216; 101/136; 101/348; 101/349.1; 101/479
(58) Field of Search ................................ 101/216, 136, 101/349.1, 348, 479

(56) References Cited

U.S. PATENT DOCUMENTS

| | | | |
|---|---|---|---|
| 2,129,699 A | 9/1938 | Luehrs | 101/1 |
| 2,605,701 A | 8/1952 | Huebner | 101/216 |
| 4,966,076 A | 10/1990 | John | 101/216 |
| 5,570,634 A | 11/1996 | Harter | 101/375 |
| 5,647,275 A | 7/1997 | Lupa et al. | 101/216 |
| 5,787,813 A | * 8/1998 | Reising | 101/479 |
| 6,019,038 A | 2/2000 | Kusunoki | 101/216 |

FOREIGN PATENT DOCUMENTS

| | | | |
|---|---|---|---|
| DE | 19962421 | 6/2001 | ......... B41F/13/008 |
| GB | 2140532 | 11/1984 | ............. F16D/1/02 |

* cited by examiner

*Primary Examiner*—Andrew H. Hirshfeld
*Assistant Examiner*—Marvin P. Crenshaw
(74) *Attorney, Agent, or Firm*—Bartlett & Sherer; Ronald B. Sherer

(57) ABSTRACT

A mounting system is disclosed for removably mounting rollers and cylinders in a machine for quick and easy removal and replacement by other rollers and cylinders. The mounting system provides for rapid separation of the journal from the roller or cylinder so that only the roller or cylinder is removed, and the mounting system has particular applicability with respect to ink rolls in printing machines.

28 Claims, 8 Drawing Sheets

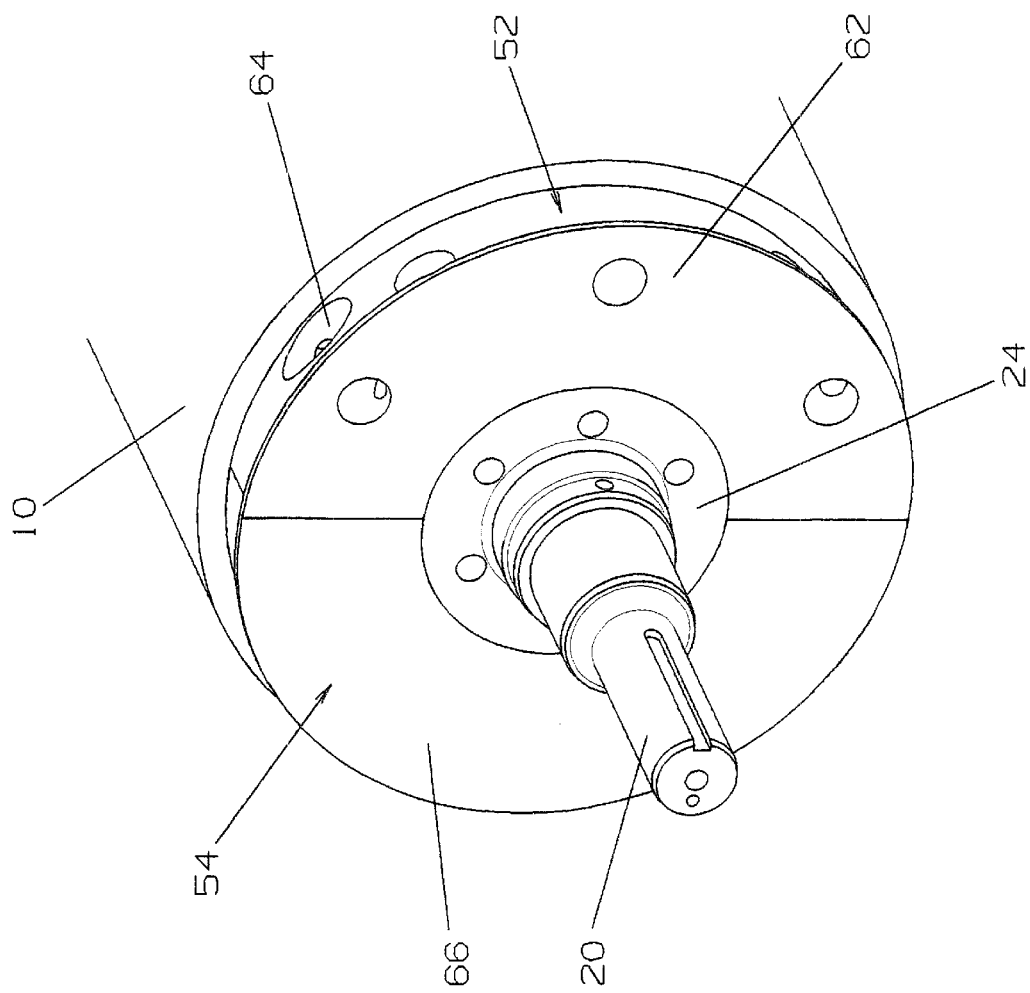

QUICK CHANGE INK ROLL

FIELD

This invention relates to the field of rotary printing, and more particularly, to an ink roll or other cylinder which may be removed and replaced with another ink roll or cylinder much more easily and quickly than previously possible.

BACKGROUND

In rotary printing, such as in flexographic printing of multi-colored images, it is well known that different ink rolls having different surface configurations must be used so as to print most clearly in different situations. For example, so-called "high line-count" ink rolls are required for high or detailed graphics, while "low line-count" ink rolls are required for solid color or so-called "block" printing. This is particularly true when printing on sheets of corrugated cardboard so as to form advertising displays, or containers for many different products. In flexographic printing, aqueous inks are used, and the ink rolls are sometimes referred to herein as anilox rolls.

As a result of the above-indicated requirements, it is often necessary to remove one ink roll of a certain line-count and replace it with another ink roll of a different line-count before beginning the next run of sheets to be printed. In the past, the removal and replacement of ink rolls has taken many hours and has resulted in substantial losses of production. For example, the ink roll is closely surrounded by other structures such as the ink fountain and the printing cylinder, as well as the train of drive gears in a multi-stage printing machine. Thus, it has been necessary to disassemble many components of the machine in order to free the ink roll and its one-piece journal so as to remove it from the machine. In addition, it will be understood that each ink roll may be in the order of 10 feet in length, and may weigh 1,500 pounds or more, which further complicates the removal and replacement process, and results in many hours of down time for the operator.

SUMMARY

The present invention provides a mounting system for quick and easy removal and replacement of ink rolls and other cylinders by providing mounting structures which are vertically split, and a two-piece ink roll and journal structure which enables the ink roll to be separated from the journal, thereby allowing the journal to remain mounted in the printing machine while only the ink roll or cylinder is removed and replaced.

BRIEF DESCRIPTION OF DRAWINGS

FIG. 6 is a perspective view of the second embodiment fully assembled.

DETAILED DESCRIPTION

Figure 1:
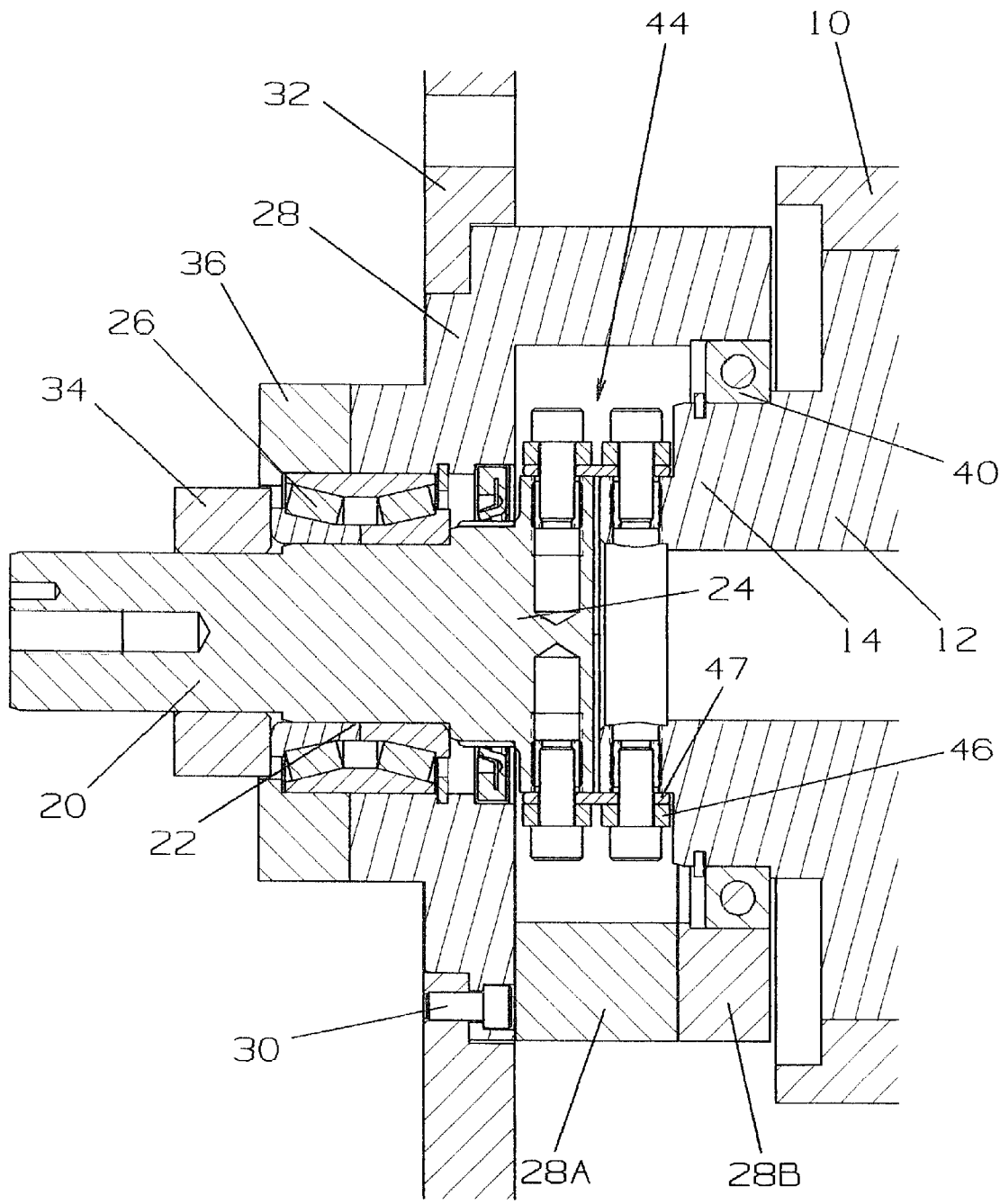
FIG. 1 is an elevational cross-sectional view of the journal and ink roll removably mounted in the printing machine.
Figure 2:
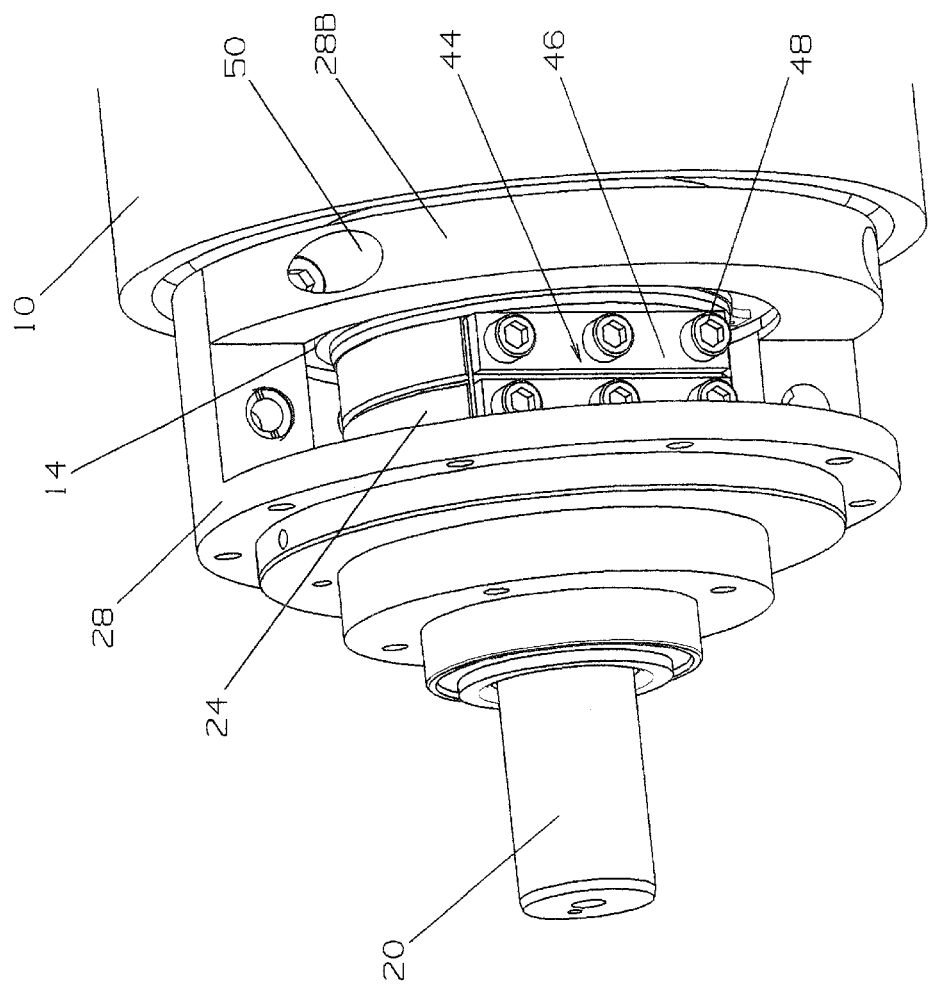
FIG. 2 is a perspective view showing the journal and ink roll partly assembled.
Figure 3:
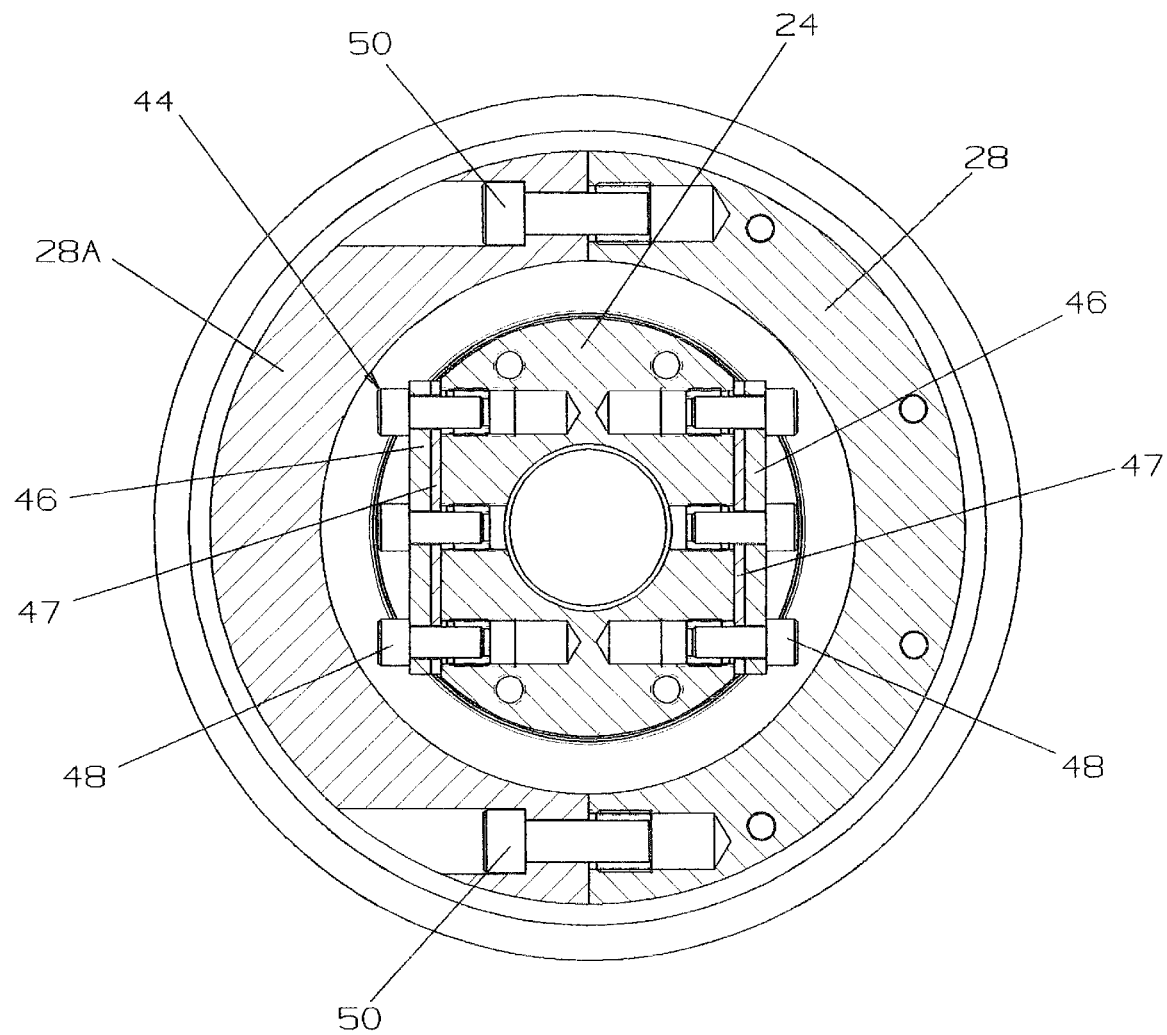
FIG. 3 is a cross-sectional view perpendicular to the longitudinal axis of the machine.

Referring first to the embodiment shown in FIGS. 1–3, numeral 10 indicates an ink roll which is permanently secured to an internal support 12 such as by a force-fit or welding or other means. Support 12 includes a portion 14 of reduced diameter, and it will be understood that elements 10, 12 and 14 form a one-piece ink roll which remains an integral unit when the ink roll is installed or removed from the machine.

As shown most clearly in the left portions of FIGS. 1 and 2, a journal 20 extends to the right toward the ink roll. Journal 20 includes a slightly enlarged bearing surface portion 22, and a substantially enlarged flange portion 24. The journal is centered by a radial-and-thrust bearing 26 which is mounted in an annular housing 28. Housing 28 is connected by bolts 30 or otherwise to an inner frame member 32 or to another stationary and permanently mounted structure of the printing machine. Bearings 26 are preferably retained in place by a retention ring 34 and an annular retainer ring 36, and it will be understood that a drive pulley or sprocket (not shown) is mounted on the end of journal 20 in order to rotate the ink roll.

Referring to the right-hand portion of FIG. 1, it will be noted that a second set of radial bearings 40 are contained in and centered by housing 28, and that bearings 40 surround reduced diameter portion 14 of the ink roll. Thus, both the ink roll and removable journal are mounted in and centered by housing 28. This assures perfect alignment between the journal and the ink roll being removed, and between the journal and the new ink roll being introduced into the machine. It will also be noted from FIGS. 1–3 that housing 28 extends 180° around the center of revolution and longitudinal axis of the ink roll, and that the other 180° is enclosed by removable semi-circular covers 28A and 28B.

Figure 1A:
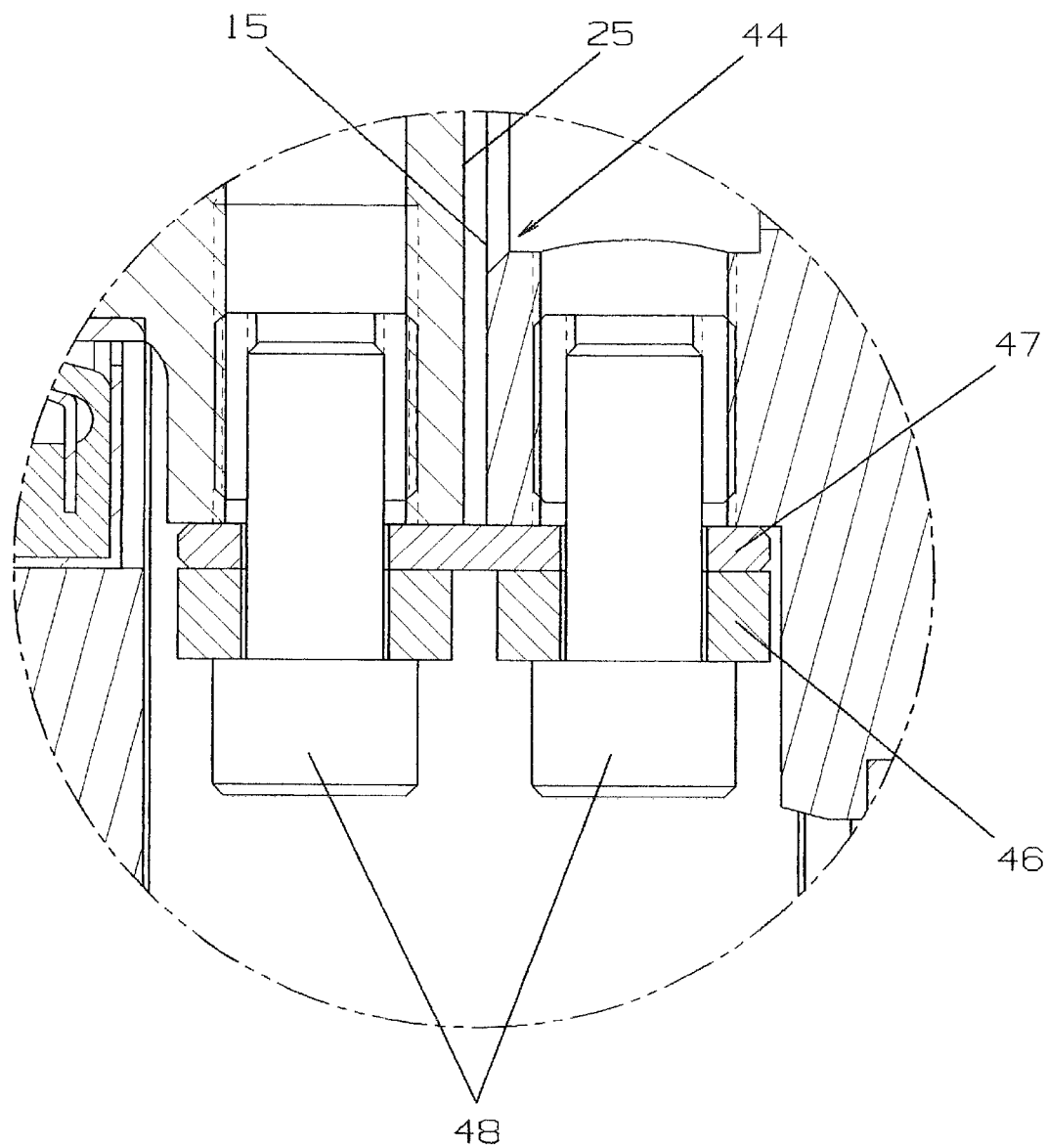
FIG. 1A is an enlargement of a portion of FIG. 1.
Figure 3A:
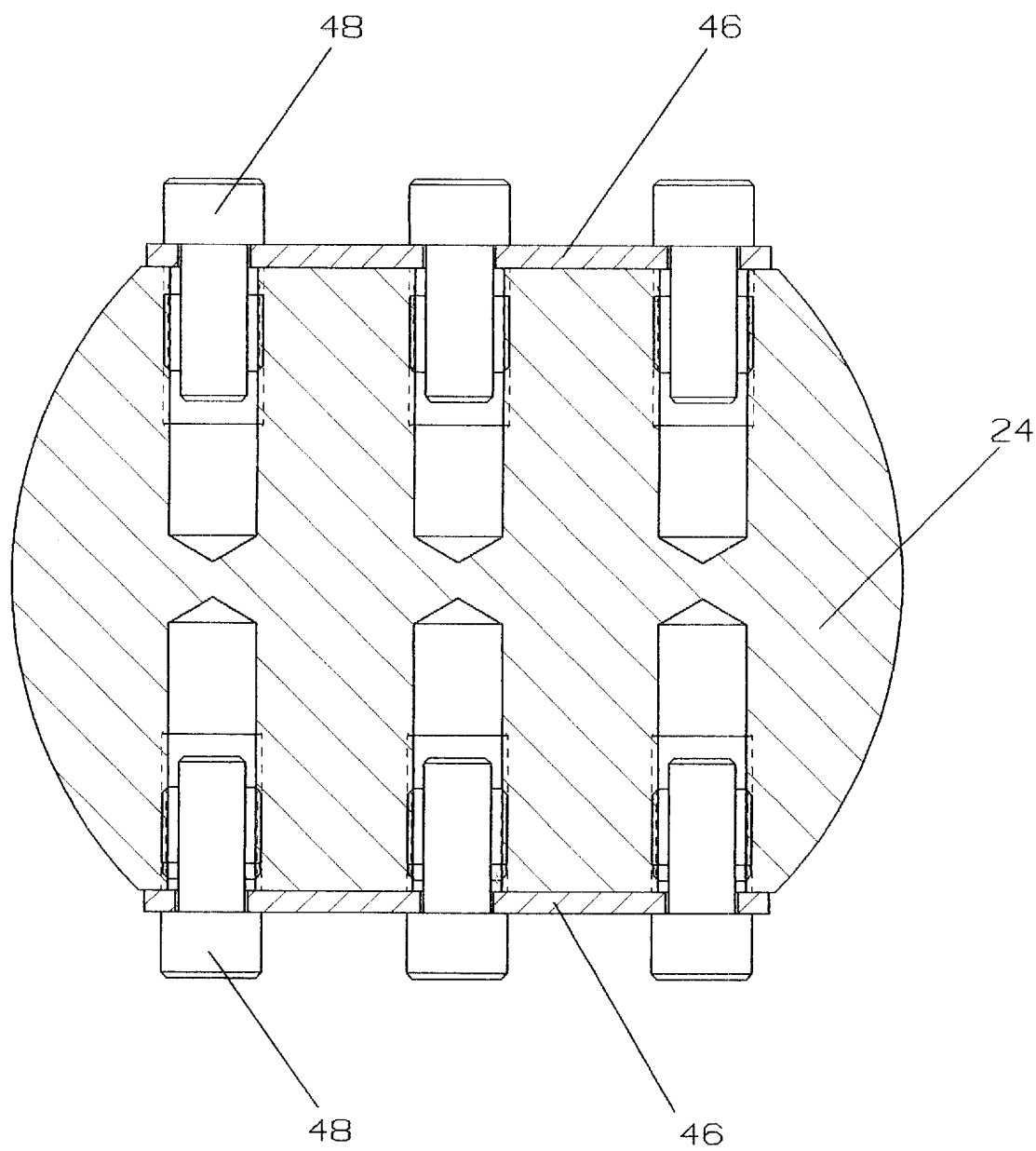
FIG. 3A is a cross-sectional view of an alternative construction of the plate-and-bolt assembly.

In order to removably connect each ink roll to the journal, flange 24 of the journal and reduced diameter portion 14 of internal support 12 are connected by removable connector assemblies 44 as illustrated in FIGS. 1–3. In one preferred embodiment, connector assemblies 44 comprise plates 46 and 47 bolted to both journal flange 24 and portion 14 of the ink roll by removable bolts 48. Plates 46 are relatively thick and rigid, whereas plates 47 are thinner and slightly flexible so as to compensate for any deviations in the matching dimensions of portions 14 and 24 beyond preset tolerances. Alternatively, shims may be employed instead of flexible plate 47. If the tolerances of portions 14 and 24 are maintained, such as by precision machining, then the flexible plates and shims may be eliminated as illustrated in FIG. 3A. In this embodiment, plates 46 alone bridge across journal portion 24 and reduced diameter portion 14 of ink roll support 12 and removably connect the ink roll to the journal. In either case, it will be understood that the end surface 15 of support portion 14 and the end surface 25 of journal flange 24 form mating planar surfaces as shown in FIGS. 1 and 1A, and that the bolt and plate assemblies 44 bridge these mating surfaces and removably secure journal 20 to the ink roll.

Operation of the First Embodiment

When it is desired to change ink rolls, bolts 50 are removed, and semi-circular cover 28A is removed. This provides direct access to bolts 48 as shown in FIG. 2 such that plates, 46 may be removed. Removal of plates 46 disconnects journal flange 24 from reduced portion 14 of the ink roll. The ink roll is then supported temporarily, by a support structure (not shown), while. cover 28B is removed. The ink roll is then removed, such as sideways to the left as viewed in FIG. 3. The present invention makes it possible to remove an ink roll in only the time that it takes to remove bolts 50 and 48, and slide the ink roll out of the machine. The required time for this removal is substantially less than one hour, whereas, prior mounting systems have required many hours to remove each ink roll. It will also be understood that the same mounting structure may be used to make printing cylinders, feed rolls, impression cylinders, die cutter cylinders and other rotary components of a printing machine easily removable and replaceable.

Figure 4:
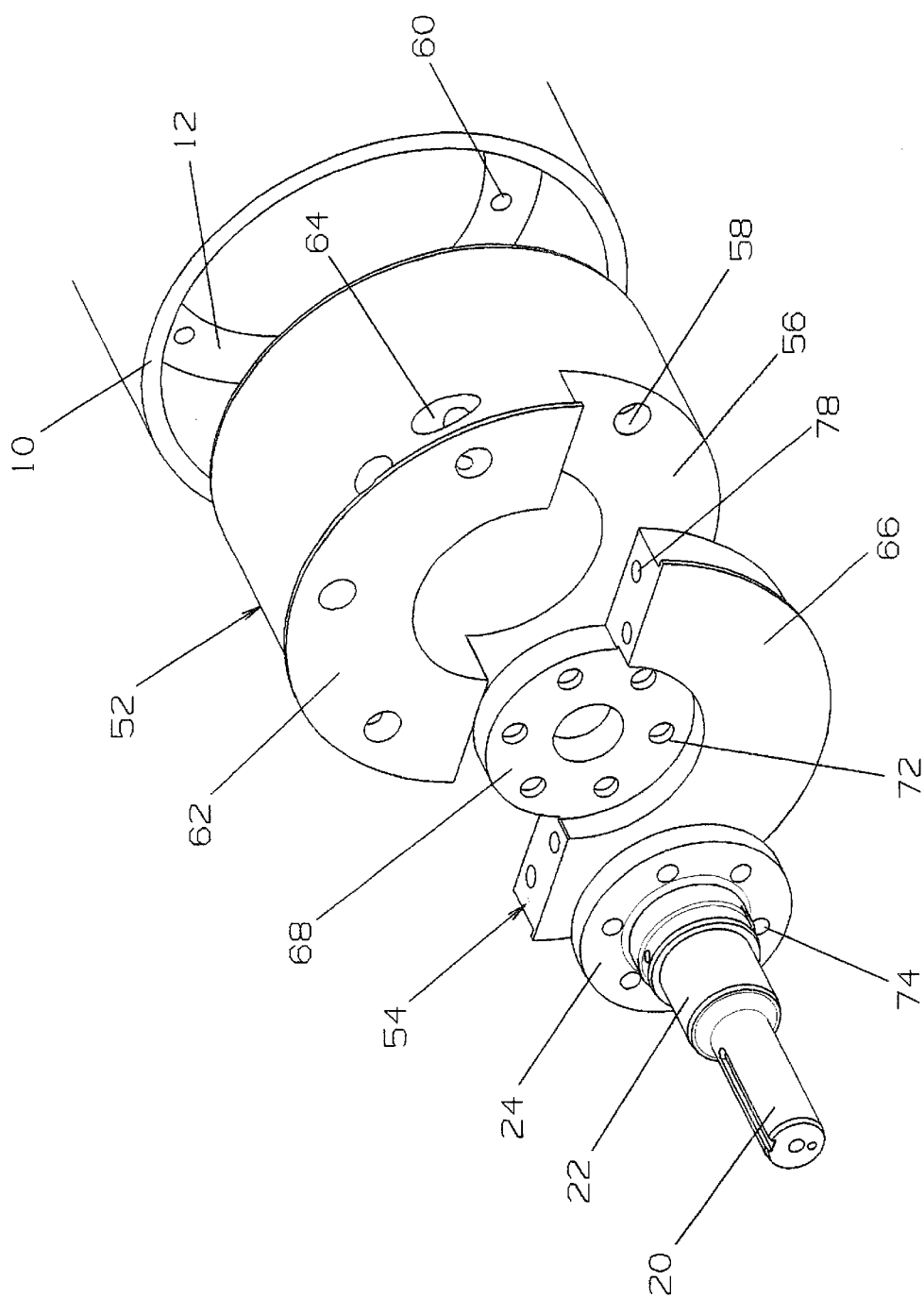
FIG. 4 is an exploded view of a second embodiment of the invention.
Figure 5:
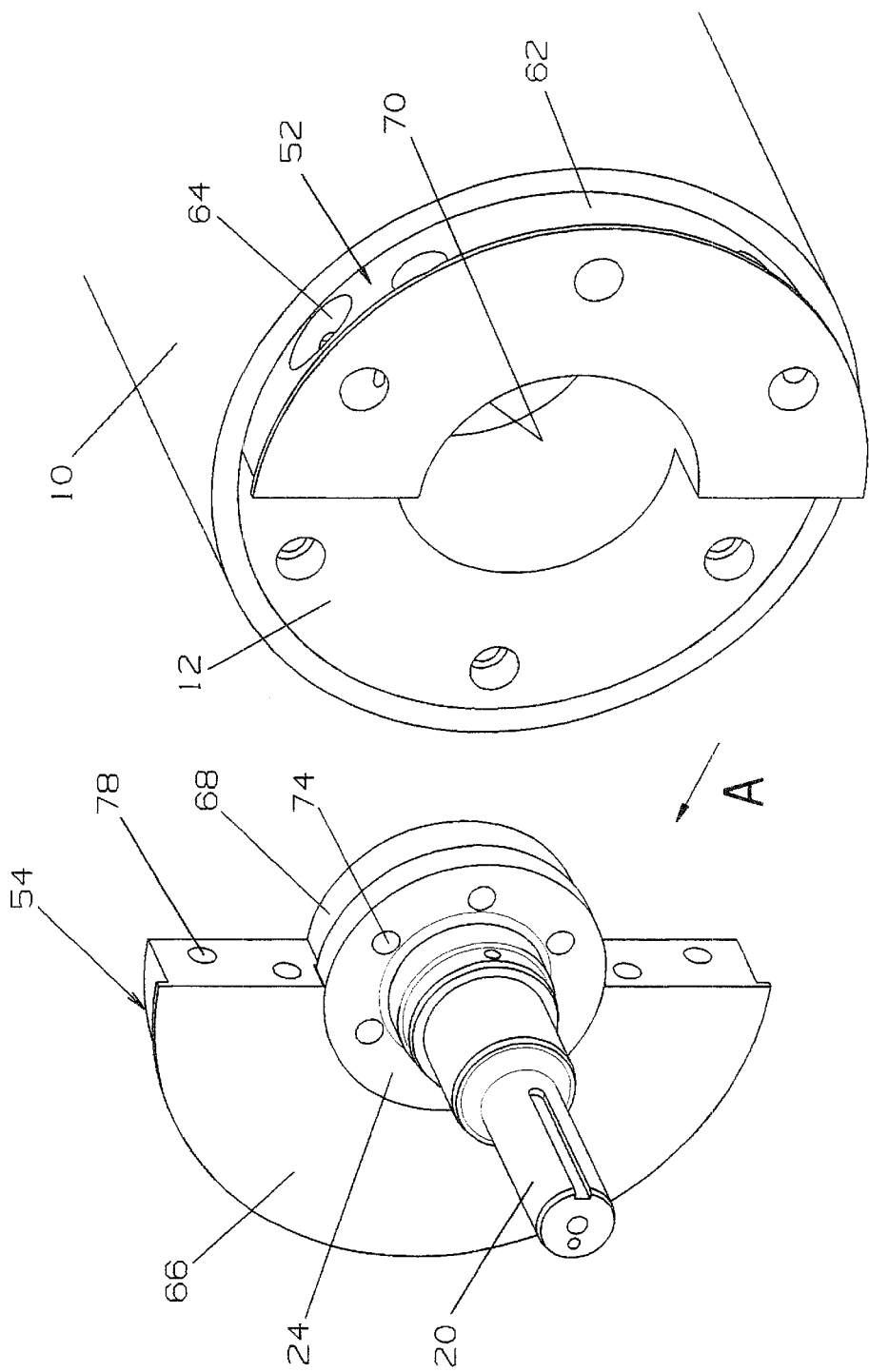
FIG. 5 is a perspective view showing the second embodiment partially assembled.

The present invention includes a second preferred embodiment as illustrated in FIGS. 4–6 in which the same numerals represent counterpart elements of the previous embodiment. The right-hand portion of FIG. 4 shows ink roll 10 with an internal support 12 which comprise a one-piece construction as previously described. The left-hand portion of FIG. 4 shows journal 20 with bearing surface 22 and an integral flange portion 24, and it will be understood that journal 20 is permanently connected to the machine as previously described. The middle portion of FIG. 4 illustrates an alternative adapter assembly comprising first and second adapters 52 and 54. Adapter 52 comprises a first circular portion 56 having a diameter equal to the inner diameter of the ink roll. Portion 56 includes bolt holes 58 which are aligned with threaded bores 60 of ink roll support 12 so that adapter 52 may be semi-permanently bolted to the ink roll in precise alignment with the axis of rotation of the ink roll; the term semi-permanently being further defined hereafter.

Adapter 52 includes an integral, arcuate portion 62 which extends 180° around the circumference of portion 56 of adapter 52. Arcuate portion 62 has an external diameter equal to the internal diameter of the ink roll, and includes angled bore holes 64 for receiving bolts tangentially. Thus, when adapter 52 is semi-permanently secured to the end of the ink roll, the assembly is as shown in the right-hand portion of FIG. 5.

As shown in the left portion of FIG. 4 and in FIG. 5, adapter 54 includes an arcuate portion 66 having a diameter equal to that of adapter portion 56. Adapter 54 also includes an integral, circular portion 68 having a circumference equal to the curvature 70 of portion 62 of adapter 52. Portion 68 is provided with bores 72 which may be aligned with bores 74 of journal flange 24.

Operation of the Second Embodiment

It will be understood that ink roll 10 is semi-permanently connected to adapter 52, and that journal 20 is permanently connected to adapter 54 which is permanently connected to the machine as previously described. Accordingly, the journal and the ink roll are as shown in FIG. 5. For connecting the ink roll to the journal; the ink roll may be simply moved to the left as shown by arrow A in FIG. 5, and bolts inserted through bores 64 and into threaded bores 78 of adapter 54. The ink roll and journal are then removably connected as shown in FIG. 6. Removal of the ink roll only requires that the bolts be removed, and the ink roll and adapter 52 may be disengaged as a one-piece unit and removed sideways from the machine in the reverse direction of arrow A. Adapter 52 may then be disconnected from the ink roll if it is to be used with the replacement ink roll to be inserted into the machine. Accordingly, the term "semi-permanently connected" is intended to mean that the ink roll and adapter 52 are removed and installed as a one-piece unit, and if an additional adapter 52 is available for the replacement ink roll, adapter 52 may remain permanently connected to the ink roll being removed.

From the foregoing description of two preferred embodiments of the invention, it will be apparent that numerous variations may be made in the invention by a person skilled in the art, and it will be apparent that the subject invention may be employed for mounting other types of rollers and cylinders for rapid removal and replacement in machines other than printing machines. Accordingly, it is to be understood that the foregoing description is intended to be illustrative of the principles of the invention, and not exhaustive thereof, and that the true invention is intended to be limited only as set forth in the following claims interpreted under the doctrine of equivalents.

What is claimed is:

1. A mounting system for removably mounting an ink roll in a printing machine comprising:
   (a) an ink roll;
   (b) a journal;
   (c) means permanently connecting said journal in said printing machine;
   (d) an annular housing surrounding said journal;
   (e) a bearing between said journal and said annular housing; and
   (f) a second bearing positioned between said ink roll and said annular housing.

2. The mounting system of claim 1 including at least one plate removably connected to said journal and to said ink roll.

3. The mounting system of claim 2 wherein said ink roll has a longitudinally extending axis of rotation, and said plate extends in a plane parallel to said axis.

4. In combination:
   (a) a printing machine including first and second spaced-apart journals;
   (b) means retaining said journals in said printing machine;
   (c) a longitudinally extending cylinder in said printing machine, said cylinder having first and second end portions and a longitudinal axis of rotation;
   (d) plate means extending parallel to said longitudinal axis; and
   (e) connector means removably connecting said plate means to said end portions and said journals for removing said cylinder from said printing machine while retaining said journals in said printing machine.

5. The combination of claim 4 wherein said journals and said cylinder end portions have mating surfaces, and said mating surfaces extend in a plane perpendicular to said longitudinal axis, and wherein said mating surfaces are spaced apart longitudinally.

6. The combination of claim 5 wherein said plate means are rigid.

7. The combination of claim 5 wherein said plate means are flexible.

8. The assembly of claim 7 wherein said plate means comprise flexible plates bridging said spaced-apart mating surfaces, and rigid plates extending over portions of said flexible plates while not bridging said spaced apart mating surfaces.

9. The combination of claim 4 wherein said end portions and said journals are of circular cross-section, and wherein said end portions and journals have planar surfaces extending in planes forming chords of said circular cross-sections.

10. The combination of claim 4 wherein said cylinder is selected from the group comprising ink rolls, printing cylinders, impression cylinders and feed rolls.

11. In combination:
(a) a machine including first and second spaced-apart walls having first and second journals mounted in said walls;
(b) means retaining said journals in said machine;
(c) a longitudinally extending cylinder in said machine, said cylinder having first and second end portions adjacent said first and second journals;
(d) said cylinder having a longitudinal axis and plate means extending parallel to said longitudinal axis; and
(e) connector means removably connecting said plate means to said end portions and said journals for removing said cylinder from said machine while retaining said journals in said machine.

12. The combination of claim 11 wherein said journals and said cylinder end portions have mating surfaces, and said mating surfaces are spaced-apart longitudinally.

13. The assembly of claim 12 wherein said plate means include flexible plates bridging said spaced apart mating surfaces.

14. The combination of claim 11 wherein said end portions and said journals are of circular cross-section, and wherein said end portions and journals have planar surfaces extending in planes forming chords of said circular cross-sections.

15. A mounting system for removably mounting a cylinder in a machine comprising;
(a) a longitudinally extending cylinder having a longitudinally extending axis and spaced-apart opposite end portions;
(b) at least one journal;
(c) means for retaining said journal in the machine;
(d) at least one connector assembly removably connecting said journal to said cylinder end portion for removing said cylinder from the machine and leaving said journal connected to the machine;
(e) an annular housing surrounding said journal and including a bearing between said journal and said annular housing; and
(f) including a second bearing positioned between said cylinder end portion and said annular housing.

16. The mounting system of claim 15 wherein said connector assembly comprises at least one plate removably secured to said journal and to said cylinder end portion.

17. The mounting system of claim 15 including means for retaining said annular housing in said machine.

18. The mounting system of claim 15 including at least one removable cover element for gaining access to said at least one removable plate.

19. The mounting system of claim 15 wherein said machine is a printing machine, and said cylinder is selected from the group comprising an ink roll, a printing cylinder, an impression cylinder and a feed roll.

20. A mounting system for removably mounting a roller in a machine comprising:
(a) a roller having a longitudinal axis;
(b) a support member permanently secured to the end of said roller;
(c) a journal permanently secured in the machine;
(d) said journal having an end portion adjacent said support member;
(e) an annular housing surrounding said journal and said support member;
(f) a connector assembly removably connecting said journal said support member for removing said roller from the machine with said journal secured to said machine, said connector assembly comprising at least one plate removably bolted to said journal and to said roller support;
(g) a bearing between said journal and said annular housing; and
(h) wherein said housing extends over at least an end portion of said support member, and includes a bearing between said housing and said end portion of said support member.

21. The mounting system of claim 20 wherein said roller support and said journal have mating surfaces, said mating surfaces extending in planes transverse to said longitudinal axis, and said mating surfaces being spaced apart longitudinally.

22. The mounting system of claim 21 wherein said at least one plate is a flexible plate.

23. The mounting system of claim 21 wherein said machine is a printing machine, and said cylinder is selected from the group comprising an ink roll, a printing cylinder, an impression cylinder and a feed roll.

24. A system for removably mounting an elongated cylinder having a longitudinal axis in a machine comprising:
(a) a pair of spaced-apart journals permanently mounted in the machine;
(b) a first pair of adapters permanently connected to said spaced-apart journals;
(c) a second pair of adapters semi-permanently connected to the ends of the elongated cylinder;
(d) each of said first and second pairs of adapters having mating surfaces;
(e) said mating surfaces being in planes extending radially and longitudinally of said longitudinal axis; and
(f) removable connector means securing said first and second pairs of adapters together with said radially and longitudinally extending surfaces in engagement for quick removal of the cylinder with said second adapters while said first adapters remain connected to the machine.

25. The system of claim 24 wherein said first and second adapters have semi-circular portions carrying said mating surfaces, and said mating surfaces extend along a diameter of the elongated cylinder.

26. The system of claim 24 wherein said removable connector means comprise a plurality of removable bolts extending through said mating surfaces.

27. The system of claim 24 wherein said machine comprises a printing machine with spaced-apart walls, and said journals are mounted in said walls.

28. The system of claim 17 wherein said cylinder comprises an ink roll or printing cylinder.

* * * * *